US012730788B2

(12) United States Patent
Gungor et al.

(10) Patent No.: US 12,730,788 B2
(45) **Date of Patent: *Sep. 8, 2026**

(54) SYSTEMS AND METHODS FOR INTERLEAVING SEARCH RESULTS

(71) Applicant: Walmart Apollo, LLC, Bentonville, AR (US)

(72) Inventors: Onur Gungor, Sunnyvale, CA (US); Tri Cao, San Bruno, CA (US); Vineet Abhishek, Mountain View, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,674

(22) Filed: Apr. 8, 2024

(65) Prior Publication Data

US 2024/0256507 A1 Aug. 1, 2024

Related U.S. Application Data

(63) Continuation of application No. 17/700,030, filed on Mar. 21, 2022, now Pat. No. 11,954,080, which is a
(Continued)

(51) Int. Cl.
*G06F 16/21* (2019.01)
*G06F 11/34* (2006.01)
(Continued)

(52) U.S. Cl.
CPC ........ *G06F 16/217* (2019.01); *G06F 11/3409* (2013.01); *G06F 16/24578* (2019.01); *G06F 16/9538* (2019.01)

(58) Field of Classification Search
CPC ............... G06F 16/217; G06F 11/3072; G06F 11/3409; G06F 16/24578; G06F 16/951; G06F 16/9538
(Continued)

(56) References Cited

U.S. PATENT DOCUMENTS 6,728,704 B2 * 4/2004 Mao ...................... G06F 16/951
6,832,218 B1 * 12/2004 Emens ................ G06F 16/9536 707/999.005

(Continued)

FOREIGN PATENT DOCUMENTS

| | | |
|---|---|---|
| CA | 2758813 | 12/2010 |
| CA | 3128459 | 8/2020 |

(Continued)

OTHER PUBLICATIONS

Lewandowski, D, “A Framework for Evaluating the Retrieval Effectiveness of Search Engines”, arXiv: 1511.05817 [cs.IR], https://doi.org/10.48550/arXiv.1511.05817, Publication date Nov. 18, 2015, pp. 1-19. (Year: 2015).*

(Continued)

*Primary Examiner* — Phuong Thao Cao
(74) *Attorney, Agent, or Firm* — DICKINSON WRIGHT RLLP; Hector A. Agdeppa

(57) ABSTRACT

A system including one or more processors and one or more non-transitory computer-readable media storing computing instructions that, when executed on the one or more processors, cause the one or more processors to perform operations: generating, using at least two different search algorithms, combined search results based on a search query, each search result of the combined search results having a respective rank based on at least one of the at least two different searching algorithms; determining a set of search results from the combined search results, wherein each result within the set of search results was respectively interacted with by at least one user; and determining a traffic impact for each result rank in the set of search results. Other embodiments are described herein.

16 Claims, 5 Drawing Sheets

Related U.S. Application Data continuation of application No. 16/460,429, filed on Jul. 2, 2019, now Pat. No. 11,281,640.

(51) Int. Cl.
*G06F 16/2457* (2019.01)
*G06F 16/9538* (2019.01)

(58) Field of Classification Search
USPC .......................................................... 707/802
See application file for complete search history.

(56) References Cited

U.S. PATENT DOCUMENTS

| | | | | |
|---|---|---|---|---|
| 7,424,469 | B2 | 9/2008 | Ratnaparkhi | |
| 7,873,633 | B2 * | 1/2011 | Smolyanskiy | G06F 16/9032 706/20 |
| 8,086,600 | B2 * | 12/2011 | Bailey | G06F 16/951 707/723 |
| 8,090,703 | B1 | 1/2012 | Agarwal et al. | |
| 8,209,330 | B1 | 6/2012 | Covell et al. | |
| 8,266,141 | B2 * | 9/2012 | Radlinski | G06F 16/9535 707/723 |
| 8,359,309 | B1 | 1/2013 | Provine et al. | |
| 8,392,394 | B1 * | 3/2013 | Kumar | G06F 16/951 707/723 |
| 8,433,512 | B1 | 4/2013 | Lopatenko et al. | |
| 8,484,202 | B2 | 7/2013 | Radlinski et al. | |
| 8,498,974 | B1 * | 7/2013 | Kim | G06F 16/245 707/706 |
| 8,661,029 | B1 | 2/2014 | Kim et al. | |
| 8,756,210 | B1 | 6/2014 | Guha | |
| 8,762,373 | B1 | 6/2014 | Zamir et al. | |
| 8,874,555 | B1 | 10/2014 | Kim et al. | |
| 9,063,972 | B1 | 6/2015 | Marra et al. | |
| 9,210,056 | B1 | 12/2015 | Choudhary et al. | |
| 9,558,233 | B1 | 1/2017 | Kim et al. | |
| 9,646,055 | B2 * | 5/2017 | Kumar | G06F 16/9535 |
| 10,007,730 | B2 | 6/2018 | Horvitz et al. | |
| 10,042,888 | B2 | 8/2018 | Chen et al. | |
| 10,489,284 | B1 | 11/2019 | Saraf | |
| 10,878,006 | B2 | 12/2020 | Guney | |
| 11,537,624 | B2 | 12/2022 | Zhang et al. | |
| 2003/0041054 | A1 | 2/2003 | Mao et al. | |
| 2004/0103087 | A1 | 5/2004 | Mukherjee et al. | |
| 2004/0215607 | A1 * | 10/2004 | Travis, Jr. | G06F 16/9538 |
| 2004/0267774 | A1 | 12/2004 | Lin et al. | |
| 2005/0149504 | A1 | 7/2005 | Ratnaparkhi | |
| 2005/0165745 | A1 | 7/2005 | Hagale et al. | |
| 2006/0106764 | A1 | 5/2006 | Girgensohn et al. | |
| 2006/0287980 | A1 * | 12/2006 | Liu | G06F 16/951 |
| 2008/0126303 | A1 | 5/2008 | Park et al. | |
| 2008/0140647 | A1 | 6/2008 | Bailey et al. | |
| 2008/0275882 | A1 | 11/2008 | Kehl et al. | |
| 2009/0019030 | A1 | 1/2009 | Smolyanskiy | |
| 2009/0083226 | A1 | 3/2009 | Kawale et al. | |
| 2009/0089267 | A1 | 4/2009 | Chi et al. | |
| 2009/0089311 | A1 | 4/2009 | Chi et al. | |
| 2009/0094224 | A1 | 4/2009 | Ricket et al. | |
| 2009/0106221 | A1 | 4/2009 | Meyerzon et al. | |
| 2009/0119254 | A1 | 5/2009 | Cross et al. | |
| 2009/0287655 | A1 | 11/2009 | Bennett | |
| 2009/0292685 | A1 | 11/2009 | Liu et al. | |
| 2010/0082510 | A1 | 4/2010 | Gao et al. | |
| 2010/0082604 | A1 | 4/2010 | Gutt et al. | |
| 2010/0088020 | A1 | 4/2010 | Sano et al. | |
| 2010/0161643 | A1 | 6/2010 | Gionis et al. | |
| 2010/0174736 | A1 * | 7/2010 | Goodall | G06F 16/951 707/769 |
| 2010/0179948 | A1 | 7/2010 | Xie et al. | |
| 2010/0198813 | A1 | 8/2010 | Chi et al. | |
| 2010/0306191 | A1 * | 12/2010 | LeBeau | G06F 16/24578 707/723 |
| 2010/0306213 | A1 | 12/2010 | Taylor et al. | |
| 2011/0004592 | A1 | 1/2011 | Shiraishi | |
| 2011/0004608 | A1 * | 1/2011 | Solaro | G06F 16/951 707/769 |
| 2011/0137902 | A1 * | 6/2011 | Wable | G06F 16/9536 707/E17.014 |
| 2011/0137932 | A1 | 6/2011 | Wable | |
| 2011/0270828 | A1 | 11/2011 | Varma et al. | |
| 2012/0023104 | A1 | 1/2012 | Johnson et al. | |
| 2012/0150837 | A1 * | 6/2012 | Radlinski | G06F 16/951 707/E17.084 |
| 2012/0221560 | A1 | 8/2012 | Chevalier et al. | |
| 2012/0303830 | A1 | 11/2012 | Tobioka | |
| 2013/0124496 | A1 * | 5/2013 | Edgar | G06F 16/955 707/E17.014 |
| 2013/0159298 | A1 | 6/2013 | Mason et al. | |
| 2013/0173573 | A1 * | 7/2013 | Song | G06F 16/9535 707/706 |
| 2013/0173639 | A1 | 7/2013 | Chandra et al. | |
| 2013/0191329 | A1 | 7/2013 | Dozier et al. | |
| 2013/0262454 | A1 | 10/2013 | Srikrishna | |
| 2014/0358882 | A1 | 12/2014 | Diab | |
| 2014/0358916 | A1 | 12/2014 | Anand et al. | |
| 2015/0039606 | A1 | 2/2015 | Salaka et al. | |
| 2015/0161176 | A1 | 6/2015 | Majkowska et al. | |
| 2015/0161255 | A1 * | 6/2015 | Battle | H04L 67/30 707/706 |
| 2016/0055252 | A1 | 2/2016 | Makeev et al. | |
| 2016/0300140 | A1 | 10/2016 | Joseph et al. | |
| 2016/0321694 | A1 | 11/2016 | Vorozhtsov | |
| 2017/0091192 | A1 | 3/2017 | Kuralenok et al. | |
| 2017/0124183 | A1 | 5/2017 | Braham et al. | |
| 2017/0140053 | A1 | 5/2017 | Vorobev et al. | |
| 2017/0154313 | A1 | 6/2017 | Duerr et al. | |
| 2017/0185599 | A1 | 6/2017 | Glover et al. | |
| 2017/0255653 | A1 | 9/2017 | Zhu et al. | |
| 2018/0011876 | A1 | 1/2018 | Li et al. | |
| 2018/0150466 | A1 | 5/2018 | Paquet et al. | |
| 2018/0165310 | A1 | 6/2018 | Coll et al. | |
| 2018/0190272 | A1 | 7/2018 | Georges et al. | |
| 2019/0205472 | A1 | 7/2019 | Kulkarni | |
| 2019/0236202 | A1 | 8/2019 | Guney | |
| 2019/0253251 | A1 | 8/2019 | Kobayashi et al. | |
| 2019/0286746 | A1 * | 9/2019 | Li | G06F 16/9538 |
| 2020/0097560 | A1 | 3/2020 | Kulkarni | |
| 2020/0192920 | A1 | 6/2020 | Filonov et al. | |
| 2020/0250197 | A1 | 8/2020 | Yang et al. | |
| 2020/0293591 | A1 * | 9/2020 | Prelovac | G06F 16/9538 |
| 2020/0320100 | A1 | 10/2020 | Piecko et al. | |
| 2020/0320153 | A1 * | 10/2020 | Luz Xavier Da Costa | G06F 16/9535 |
| 2020/0380582 | A1 | 12/2020 | Nuta et al. | |
| 2020/0387517 | A1 | 12/2020 | Huang et al. | |

FOREIGN PATENT DOCUMENTS

| | | | | |
|---|---|---|---|---|
| CN | 101764807 A | | 9/2012 | |
| DE | 112005003035 B4 | | 9/2011 | |
| TW | I540448 B | * | 7/2016 | G06F 16/951 |
| WO | 2019041284 | | 3/2019 | |

OTHER PUBLICATIONS

Chapelle, O., et al., Large-Scale Validation and Analysis of Interleaved Search Evaluation, ACM Trans. Inf. Syst. 30, 1, Article 6 (Feb. 2012), 41 pages Feb. 2012.

* cited by examiner

SYSTEMS AND METHODS FOR INTERLEAVING SEARCH RESULTS

CROSS-REFERENCE TO RELATED APPLICATIONS

This application is a continuation of U.S. patent application Ser. No. 17/700,030, filed on Mar. 21, 2022, to be issued as U.S. Pat. No. 11,954,080, which is a continuation of U.S. patent application Ser. No. 16/460,429, filed Jul. 2, 2019, patented as U.S. Pat. No. 11,281,640. U.S. patent application Ser. Nos. 17/700,030 and 16/460,429, and U.S. Pat. No. 11,281,640, are herein incorporated by reference in their entirety.

TECHNICAL FIELD

This disclosure relates generally online search algorithms, and more particularly relates to interleaving search results.

BACKGROUND

Managing online and electronic search has increasingly become an endeavor that presents a number of technological problems. Over the past decade search algorithms have become more complex while libraries they search have simultaneously become larger. This development has in turn put a larger and larger burden on the computer systems that operate these algorithms and store the search libraries. This problem is made even more complicated when search algorithms and/or systems are changed in efforts to improve an experience for a user of a searching system. In the past, it has been almost impossible for an administrator to sort out impacts of changes to a search algorithm and/or system outside of changes that cause drastic improvements or deteriorations in search performance. Therefore, there is a need for a system and/or method that allows quantitative analysis of search engine changes so that administrators of the search engine can easily determine their effects.

BRIEF DESCRIPTION OF THE DRAWINGS

To facilitate further description of the embodiments, the following drawings are provided in which.

Figure 1:
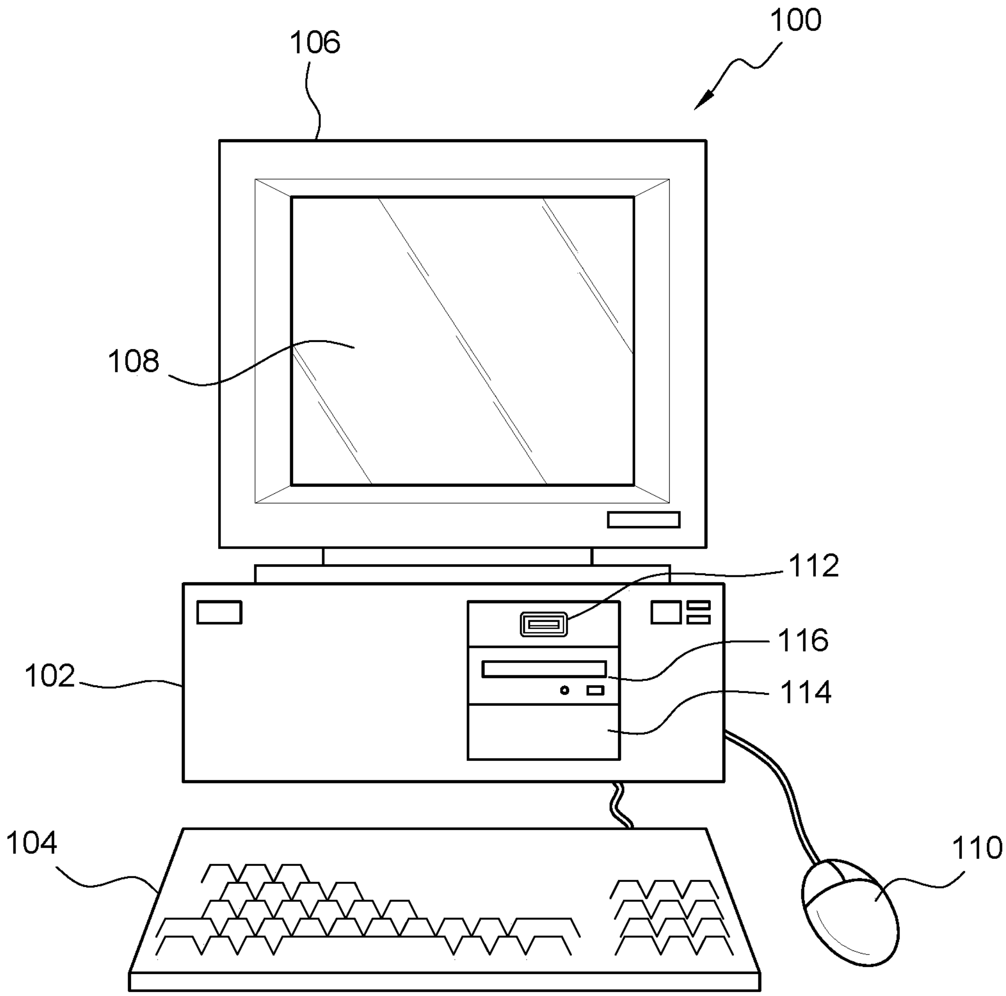
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and cause the one or more processors to perform functions comprising, in response to a search query from an electronic device of a user, creating combined search results using at least two different searching algorithms, each search result of the combined search results having a respective combined search results rank; receiving, from the electronic device of the user, an interaction with a search result of the combined search results; storing, in the one or more non-transitory computer-readable storage devices, the interaction with the search result of the combined search results, wherein: the interaction with the search result of the combined search results, as stored, indicates whether the search result of the combined search results was a part of (a) results of a first search algorithm of the at least two different searching algorithms, (b) results of a second search algorithm of the at least two different searching algorithms, or (c) both the results of the first search algorithm of the at least two different searching algorithms and the results of the second search algorithm of the at least two different searching algorithms; determining a set of search results from the combined search results, wherein each result within the set of the search results from the combined search results was interacted with by at least one user; and determining, using the set of the search results from the combined search results, a traffic impact for each respective combined search results rank in the combined search results.

Various embodiments include a method. The method can be implemented via execution of computing instructions configured to run at one or more processors and configured to be stored at non-transitory computer-readable media The method can comprise, in response to a search query from an electronic device of a user, creating combined search results using at least two different searching algorithms, each search result of the combined search results having a respective combined search results rank; receiving, from the electronic device of the user, an interaction with a search result of the combined search results; storing, in the one or more non-transitory computer-readable storage devices, the interaction with the search result of the combined search results, wherein: the interaction with the search result of the combined search results, as stored, indicates whether the search result of the combined search results was a part of (a) results of a first search algorithm of the at least two different searching algorithms, (b) results of a second search algorithm of the at least two different searching algorithms, or (c) both the results of the first search algorithm of the at least two different searching algorithms and the results of the second search algorithm of the at least two different searching algorithms; determining a set of search results from the combined search results, wherein each result within the set of the search results from the combined search results was interacted with by at least one user; and determining, using the set of the search results from the combined search results, a traffic impact for each respective combined search results rank in the combined search results.

A number of embodiments can include a system. The system can include one or more processors and one or more non-transitory computer-readable storage devices storing computing instructions. The computing instructions can be configured to run on the one or more processors and perform acts of receiving a search query from an electronic device of a user; performing a first search for the search query in a database using a first searching algorithm to retrieve results of the first search; assigning a respective first rank to each search result of the results of the first search; performing a second search for the search query in the database using a second searching algorithm to retrieve results of the second search, wherein the first searching algorithm and the second searching algorithm can be different searching algorithms; assigning a respective second rank to each search result of the results of the second search; interleaving the results of the second search between the results of the first search to create combined search results, wherein each search result of the combined search results can have a respective combined search results rank; facilitating a display, on the electronic device of the user, of the combined search results; receiving, from the electronic device of the user, an interaction with a search result of the combined search results; storing, in the one or more non-transitory computer-readable storage devices, the interaction with the search result of the combined search results, wherein: the interaction with the search result of the combined search results, as stored, can indicate whether the search result of the combined search results was a part of the results of the first search, the results of the second search, or both the results of the first search and the results of the second search; generating a report based at least in part on the interaction with the search result of the combined search results, as stored; and facilitating a display, on an electronic device of an administrator, of the report.

Various embodiments include a method. The method can be implemented via execution of computing instructions configured to run at one or more processors and configured to be stored at non-transitory computer-readable media The method can comprise receiving a search query from an electronic device of a user; performing a first search for the search query in a database using a first searching algorithm to retrieve results of the first search; assigning a respective first rank to each search result of the results of the first search; performing a second search for the search query in the database using a second searching algorithm to retrieve results of the second search, wherein the first searching algorithm and the second searching algorithm can be different searching algorithms; assigning a respective second rank to each search result of the results of the second search; interleaving the results of the second search between the results of the first search to create combined search results, wherein each search result of the combined search results can have a respective combined search results rank; facilitating a display, on the electronic device of the user, of the combined search results; receiving, from the electronic device of the user, an interaction with a search result of the combined search results; storing, in the one or more non-transitory computer-readable storage devices, the interaction with the search result of the combined search results, wherein: the interaction with the search result of the combined search results, as stored, can indicate whether the search result of the combined search results was a part of the results of the first search, the results of the second search, or both the results of the first search and the results of the second search; generating a report based at least in part on the interaction with the search result of the combined search results, as stored; and facilitating a display, on an electronic device of an administrator, of the report.

A number of embodiments include a system including one or more processors and one or more non-transitory computer-readable media storing computing instructions that, when executed on the one or more processors, cause the one or more processors to perform certain acts. The acts can include generating, using at least two different search algorithms, combined search results based on a search query from an electronic device of a user, each search result of the combined search results having a respective rank based on at least one of the at least two different searching algorithms. The acts also can include determining a set of search results from the combined search results. Each result within the set of search results can be respectively interacted with by at least one user. The acts further can include determining a traffic impact for each result rank in the set of search results. The traffic impact for each result rank in the combined search results can be based on an average number of search results that were interacted with by at least one user from among results of a first search algorithm and results of a second search algorithm of the at least two different search algorithms.

Several embodiments include a method implemented via execution of computing instructions configured to run at one or more processors and configured to be stored at one or more non-transitory computer-readable media. The method can include generating, using at least two different search algorithms, combined search results based on a search query from an electronic device of a user, each search result of the combined search results having a respective rank based on at least one of the at least two different searching algorithms. The method also can include determining a set of search results from the combined search results. Each result within the set of search results can be respectively interacted with by at least one user. The method further can include determining a traffic impact for each result rank in the set of search results. The traffic impact for each result rank in the combined search results can be based on an average number of search results that were interacted with by at least one user from among results of a first search algorithm and results of a second search algorithm of the at least two different search algorithms.

Figure 2:
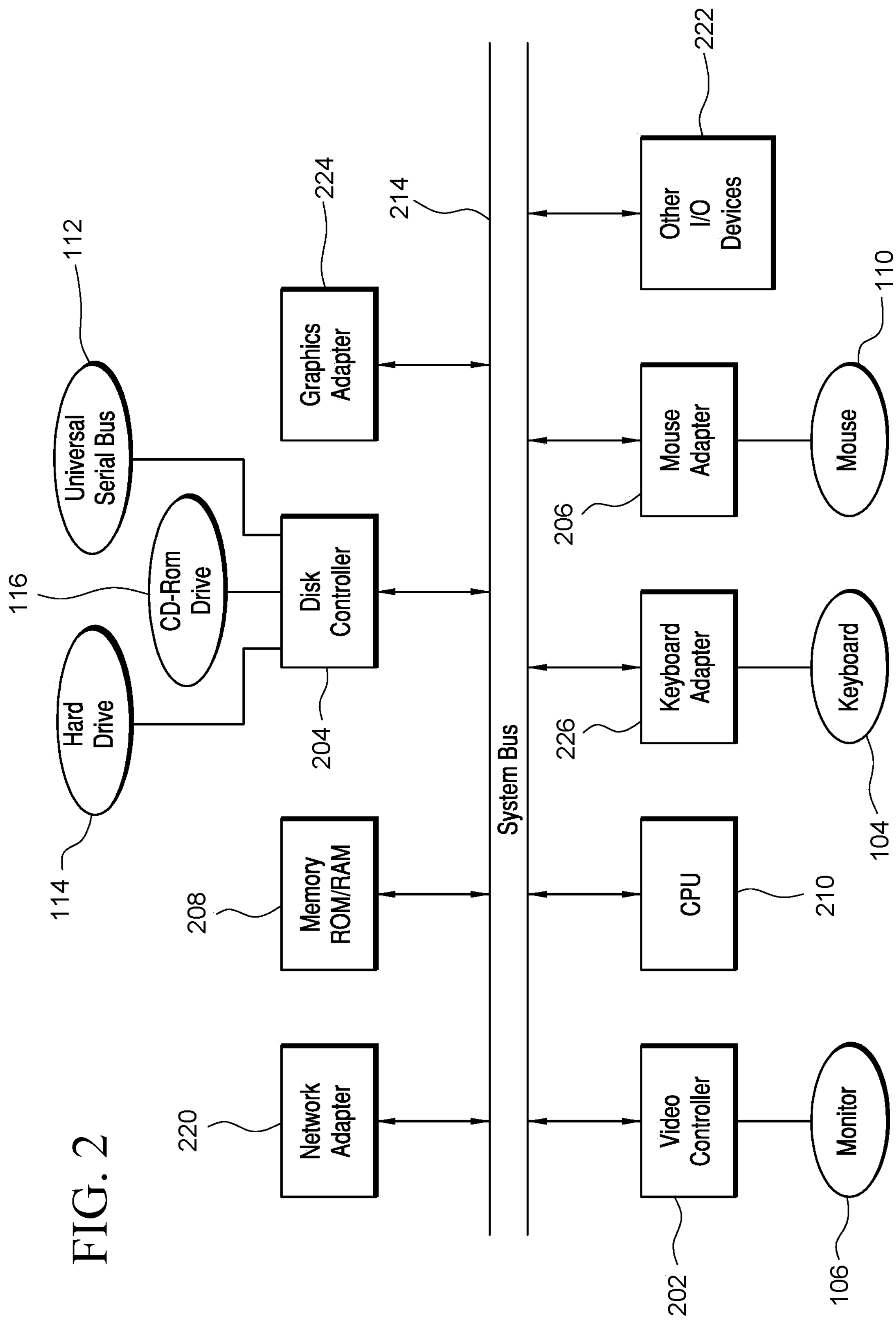
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
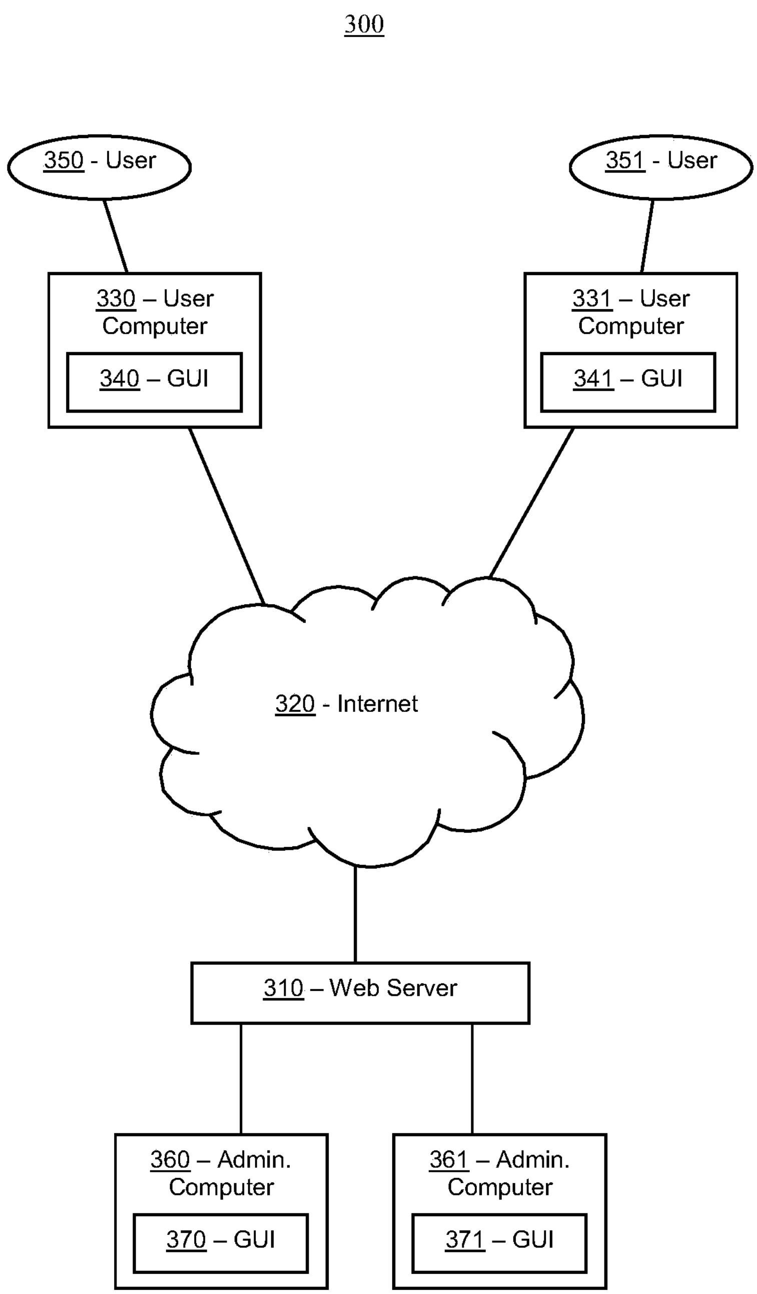
FIG. 3 illustrates a representative block diagram of a system, according to an embodiment.

Turning ahead in the drawings, FIG. 3 illustrates a block diagram of a system 300 that can be employed for interleaving search results, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

and/or In some embodiments, system 300 can include a web server 310, an internet 320. Web server 310 and/or internet 320 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310 and/or internet 320. Additional details regarding web server 310 and/or internet 320 are described herein.

In many embodiments, system 300 also can comprise user computers 330, 331 and/or administrator ("admin.") computers 360, 361. User computers 330, 331 and/or admin. computers 360, 361 can comprise any of the elements described in relation to computer system 100. In some embodiments, user computers 330, 331 and/or admin. computers 360, 361 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interface ("GUI") 340, 341, 370, 371. In the same or different embodiments, GUI 340, 341, 370, 371 can be part of and/or displayed by user computers 330, 331 and/or admin. computers 360, 361, which also can be part of system 300. In some embodiments, GUI 340, 341, 370, 371 can comprise text and/or graphics (image) based user interfaces. In the same or different embodiments, GUI 340, 341, 370, 371 can comprise a heads up display ("HUD"). When GUI 340, 341, 370, 371 comprises a HUD, GUI 340, 341, 370, 371 can be projected onto glass or plastic, displayed in midair as a hologram, or displayed on monitor 106 (FIG. 1). In various embodiments, GUI 340, 341, 370, 371 can be color or black and white. In many embodiments, GUI 340, 341, 370, 371 can comprise an application running on a computer system, such as computer system 100, user computers 330, 331, admin. computers 360, 361, and/or web server 310. In the same or different embodiments, GUI 340, 341, 370, 371 can comprise a website accessed through internet 320. In some embodiments, GUI 340, 341, 370, 371 can comprise an eCommerce website. In the same or different embodiments, GUI 340, 341, 370, 371 can be displayed as or on a virtual reality (VR) and/or augmented reality (AR) system or display.

In some embodiments, web server 310 can be in data communication through Internet 320 with user computers (e.g., 330, 331) and/or admin. computers 360, 361. In certain embodiments, user computers 330, 331 and/or admin. computers 360, 361 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310, internet 320, user computer 330, 331, and/or admin. computers 360, 361 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) web server 310, internet 320, user computer 330, 331, and/or admin. computers 360, 361 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310, internet 320, user computer 330, 331, and/or admin. computers 360, 361. In a similar manner, the processing module(s) and the memory storage module(s) can be local and/or remote to each other.

In many embodiments, web server 310, internet 320, user computer 330, 331, and/or admin. computers 360, 361 can be configured to communicate with each other. In some embodiments, user computer 330, 331 can also be referred to as customer computers, and admin. computers 360, 361 can be referred to as employee computers. In some embodiments, web server 310, internet 320, user computer 330, 331, and/or admin. computers 360, 361 can communicate through a network or internet 320. In some embodiments, internet 320 can be an intranet that is not open to the public. Accordingly, in many embodiments, web server 310, internet 320, user computer 330, 331, and/or admin. computers 360, 361 (and/or the software used by such systems) can refer to a back end of system 300 operated by an operator and/or administrator of system 300, and user computers 330 and 331 (and/or the software used by such systems) can refer to a front end of system 300 used by one or more users 350, 351, respectively. In some embodiments, users 350, 351 can also be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310, internet 320, user computer 330, 331, and/or admin. computers 360, 361 also can be configured to communicate with and/or store one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, internet 320, user computer 330, 331, and/or admin. computers 360, 361, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for faster and more efficient return of search results from large libraries of records. These techniques described herein can provide a significant improvement over conventional approaches of testing different search algorithms and/or systems, such as manually testing algorithms. In many embodiments, the techniques described herein can beneficially make determinations based on dynamic information that describes current conditions and/or conditions that have occurred during seasonal search trends.

In a number of embodiments, the techniques described herein can advantageously provide an improve user experience by displaying more relevant search results to a user. In various embodiments, the techniques described herein can dynamically tune search algorithms and/or systems in real time, as described in further detail below. This, in turn, can faster, more personalized searches for a user of the search system.

In many embodiments, the techniques described herein can be used continuously at a scale that cannot be reasonably performed using manual techniques or the human mind. For example, in order for reports to be informative, it may be necessary to analyze a large amount of search data for large websites or libraries.

In a number of embodiments, the techniques described herein can solve a technical problem that arises only within the realm of computer networks, as advanced searching algorithms do not exist outside the realm of computer networks.

Figure 4:
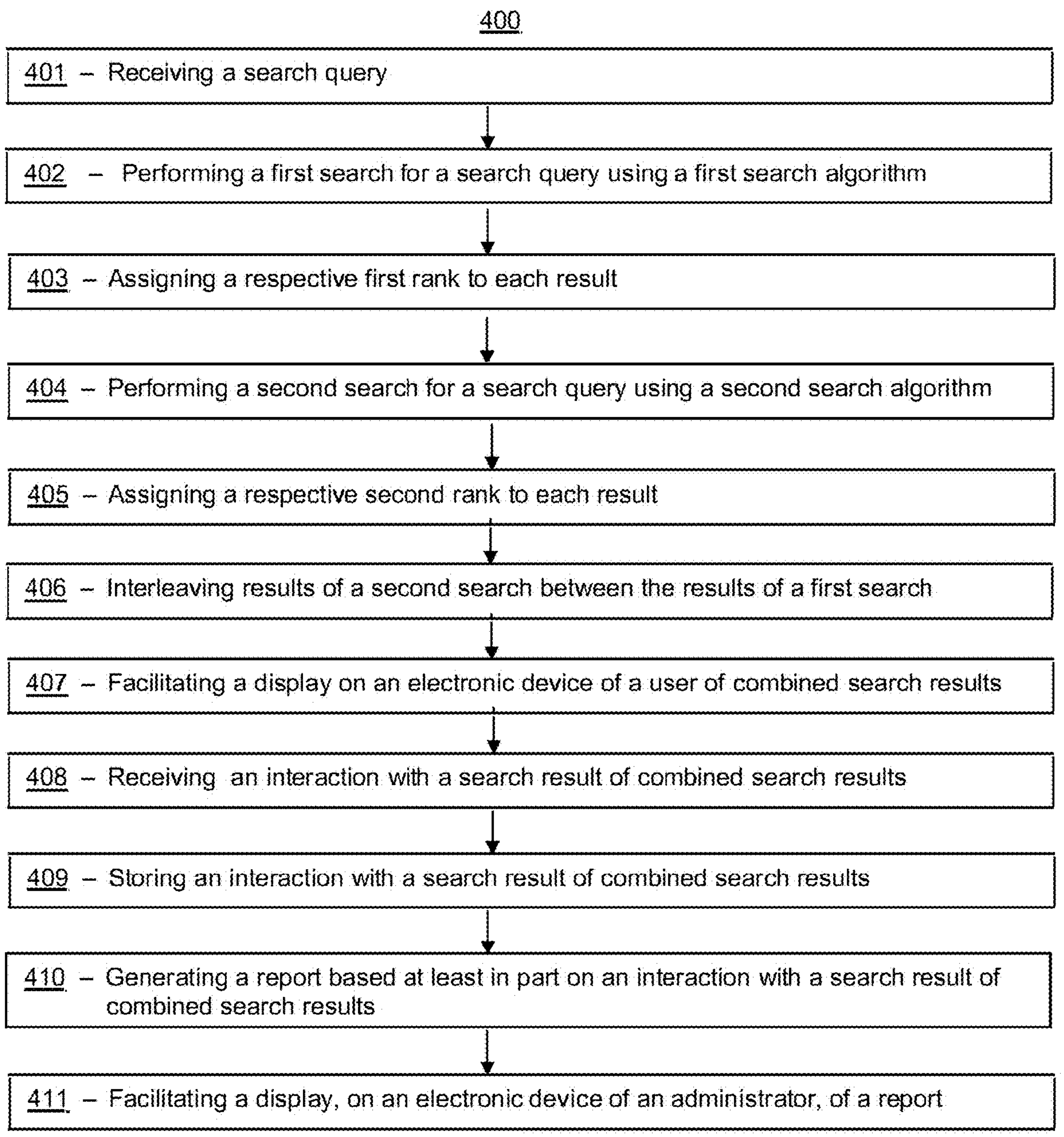
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310, internet 320, user computer 330, 331, and/or admin. computers 360, 361 (FIG. 3). The processing module(s) can be similar or identical to the processing module(s) described above with respect to computer system 100 (FIG. 1).

In many embodiments, method 400 can comprise an activity 401 of receiving a search query. In the same or different embodiments, a search query can be received from an electronic device of a user. In various embodiments, an electronic device of a user can comprise user computer 330, 331. In some embodiments, a search query can be received with an associated user ID of the user. In many embodiments, a user ID of a user can be hashed or to determine when a user is eligible for a test. In the same or different embodiments, universal hashing can be used to randomize a user ID in order to determine whether a user is eligible for a test. In some embodiments, user IDs can be assigned to an n number of buckets using a modular N function. For example, if n=1000, a hash of a user ID is 2345, then the user can be assigned to bucket 345. In the same or different embodiments, a number of buckets can then be configured based upon a number or a percentage of users an administrator wants to enroll in a test.

Next, in many embodiments, method 400 can comprise an activity 402 of performing a first search query using a first searching algorithm (also referred to as "a first search algorithm"). In the same or different embodiments, a first search algorithm can be configured to perform searches in one or more servers hosting one or more inventories. In some embodiments, one or more inventories can be stored in one or more databases. In various embodiments, one or more inventories can comprise inventories of academic papers, legal documents, webpages, products for an eCommerce website, etc. In some embodiments, the one or more servers can host the one or more inventories in a distributed manner. Therefore, in some embodiments, activity 402 and other activities in method 400 can comprise using a distributed network comprising distributed memory architecture to perform searches using a first search algorithm. This distributed architecture can reduce the impact on the network and system resources to reduce congestion in bottlenecks while still allowing searches to be sent from a central location (e.g. a user device 330, 331 (FIG. 3)).

In many embodiments, method 400 can subsequently comprise an activity 403 of assigning a respective first rank to each result. In various embodiments, a respective first rank can be determined by a first search algorithm. In some embodiments, a respective first rank can comprise a metric of a relevance (e.g., how relevant a search result is based upon an analysis of the first search algorithm) with respect to a search query, as received. In many embodiments, a respective first rank can comprise a score and/or a ranking (e.g., first, second, third, etc.).

In many embodiments, method 400 can comprise an activity 404 of performing a second search query using a second searching algorithm (also referred to as "a second search algorithm"). In the same or different embodiments, a second search algorithm can be configured to perform searches in one or more servers hosting one or more inventories. In some embodiments, one or more inventories can be stored in one or more databases. In various embodiments, one or more inventories can comprise inventories of academic papers, legal documents, webpages, products for an eCommerce website, etc. In some embodiments, the one or more servers can host the one or more inventories in a distributed manner. Therefore, in some embodiments, activity 404 and other activities in method 400 can comprise using a distributed network comprising distributed memory architecture to perform searches using a second search algorithm. This distributed architecture can reduce the impact on the network and system resources to reduce congestion in bottlenecks while still allowing searches to be sent from a central location (e.g. a user device 330, 331 (FIG. 3)). In many embodiments, a second search algorithm can be different than a first search algorithm, as described with reference to activity 402

In many embodiments, method 400 can comprise an activity 405 of assigning a respective second rank to each result. In various embodiments, a respective second rank can be determined by a second search algorithm. In some embodiments, a respective second rank can comprise a metric of a relevance (e.g., how relevant a search result is based upon an analysis of the second search algorithm) with respect to a search query, as received. In many embodiments, a respective second rank can comprise a score and/or a ranking (e.g., first, second, third, etc.). In various embodiments, a respective second rank can be the same or different than a respective first rank, as described with reference to activity 403.

While the above referenced embodiments are described as comprising two search algorithms, it will be apparent to one having skill in the art that more than two search algorithms can be used. In those embodiments, all or a portion of activities 402-405 can be performed with a third searching ("third search") algorithm, a fourth searching ("fourth search") algorithm, a fifth searching ("fifth search") algorithm, etc. In this way, multiple searching algorithms can be easily evaluated by an administrator at the same time, as described in further detail below. Further, while the above referenced embodiments are described as using search algorithms, it will be apparent to one having skill in the art that this system and/or method can be configured to be used with search systems. In these embodiments, an administrator can easily evaluate the efficiency of specific servers, locations or arrangement of servers, query routing logic in a distributed system, database management logic in a distributed system, etc.

Subsequently, in many embodiments, method 400 can comprise an activity 406 of interleaving results of a second search between results of a first search. In various embodiments, several different interleaving algorithms can be used. For example, balanced interleaving, team draft interleaving, and/or other interleaving methods can be used. Further details about interleaving algorithms are discussed in Chapelle, O. et al. *Large-Scale Validation and Analysis of Interleaved Search Evaluation, ACM Transactions on Information Systems*, Vol. 30, no. 1 (February 2012), which is herein incorporated by this reference in its entirety. In some embodiments, interleaving results of a second search between results of a first search can create combined search results. In the same or different embodiments, each search result of combined search results can have a respective combined search results rank. In many embodiments, a respective combined search results rank can comprise a score and/or a ranking (e.g., first, second, third, etc.). In various embodiments, a respective combined search results rank can be the same or different than a respective first rank and/or a respective second rank, as described with reference to activities 403 and/or 405.

In many embodiments, activity 406 can optionally comprise an activity of selecting a first search result of results of a first search having a highest rank within the first search results. In many embodiments, a rank of each search result of first search results can be determined as described in activity 403. In the same or different embodiments, activity 406 can optionally comprise an activity of selecting a second search result of results of a second search having a highest rank within the second search results. In many embodiments, a rank of each search result of second search results can be determined as described in activity 405.

In many embodiments, activity 406 can optionally comprise an activity of determining when a first search result of first search results is different than a first search result of results of a second search. In this way, it can be determined when the first search algorithm and the second search algorithm return identical results as their top result. Depending on the outcome of this determination, a number of optional next steps in activity 406 can be performed.

In many embodiments, when a first search result of results of a first search is different than a first search result of results of a second search, a combined search result rank can be assigned. In these embodiments, a combined search result rank of a search result of a first search can be set above a combined search result rank of a search result of a second search. In other words, when at least one search result returned by a search algorithm is different than other search results of other search algorithms, the at least one search result can be ranked above the other search results in the combined search results. On the other hand, in various embodiments, when a first search result of results of a first search is the same as a first search result of results of a second search, the first search result of results of the second search can be excluded from combined search results. In other words, when the same or identical search results are returned by multiple search algorithms, "extra" copies of the result are excluded from combined search results. In this way, duplicate search results can be prevented in combined search results. In the same or different embodiments, when a search result is excluded, its same or identical partner that is included in combined search results can be marked as being returned at a same rank by multiple search algorithms and/or systems. In embodiments where identical search results are excluded, the above described optional activities of activity 406 can then be repeated with a second ranked search result of results of a second search. In this way, search results returned from different search algorithms and/or systems can be automatically interleaved.

While the above described search result interleaving algorithm is described with reference to two top ranked results, it will be apparent to a person having ordinary skill in the art that it can be applied to various other exemplary embodiments. For example, three top search results of three algorithms and/or systems can be returned and interleaved. Further, this algorithm also can be applied to a sequence of ranked search results from a number of search algorithms and/or systems (e.g., second ranked results, third ranked results, fourth ranked results, etc.).

In many embodiments, method 400 can comprise an activity 407 of facilitating a display on an electronic device of a user of combined search results. In the same or different embodiments, an electronic device of a user can comprise user computer 330, 331. In these embodiments, then, a display can be facilitated on GUI 340, 341. Other embodiments, displays can be facilitated on other GUIs. In many embodiments, combined search results can be displayed in a sequence of their combined search result rank, as described above with reference to activity 406 and the associated optional activities.

In many embodiments, method 400 can comprise an activity 408 of receiving an interaction with a search result of combined search results. In some embodiments, a search result of combined search results can be displayed on an electronic device of a user, and therefore an interaction with the search result can be performed by a user. In the same or different embodiments, an interaction of a user with search result can comprise a click through of a search result, an item view of a search result, a cart add of a search result, a registry add of a search result, a transaction involving a search result, a mouse movement of a user, a touch pad movement of a user, a touchscreen interaction of a user, and/or an eye movement or other body part movement or gesture of a user.

In many embodiments, method 400 can comprise an activity 409 of storing an interaction with a search result of combined search results. In the same or different embodiments, an interaction with a search result, as stored, can be configured to indicate one or more search algorithms that returned the search result, a rank of the search result within the specific search algorithm, and/or a combined rank of the search result. In various embodiments, due to the large number of search results that are stored when running this system and/or method at a large scale (e.g., on a website that receives a large number of search queries), various techniques can be used to reduce a storage size of interactions with search results. For example, in some embodiments, sets of interactions with search results can be stored as a sparse representation. Storage efficiency can be improved by encapsulating sets of interactions with search results into coarser, conceptual sets of interactions with search results by storing them as a sparse representation. In some embodiments, a sparse representation of sets of interactions with search results can store only non-zero counts for interactions with the search results. This technique, then, can reduce required storage space, and can consequently make subsequent reading and/or processing of the sparse representation of sets of interactions with search results faster than reading and/or processing of sets of interactions with search results that are not stored as a sparse representation.

In many embodiments, a method 400 can comprise an activity 410 of generating a report based at least in part on an interaction with a search result of combined search results. In the same or different embodiments, several different metrics describing performances of each tested search algorithm and/or system can be determined and then included in a report. In some embodiments, a report can be generated only for results returned for a top number of n queries. In the same or different embodiments, n can be a number of queries displayed to a user on a first results page, a second results page, a third results page, etc. In this way, burdens on a processor can be reduced because a predetermined number of complex calculations can be run, thereby allowing a report to be generated in a reasonable amount of time for review by an administrator.

In many embodiments, a traffic impact can be calculated for an algorithm or system. A traffic impact can comprise a number of interactions with a search result at different combined ranks labeled with a search algorithm or system that generated it. In these embodiments, activity 410 can optionally comprise an activity of determining a set of search results that have an identical rank in different search algorithms and/or search results that were interacted with by a user. For example, say that a set of search results that users interacted with from both search algorithms is defined by C, a set of search results that the users interacted with from only one search algorithm is A for a first algorithm and B for a second algorithm. Impact can therefore by determined using an equation comprising $$\text{impact} = \frac{B}{A + C}$$

if an administrator wants to determine impact from a user's perspective. Other variants of impact can also be determined. For example, say that $$M = \frac{A + B}{2}.$$

An impact can then be determined using an equation comprising $$\text{impact} = \frac{M}{M + C}.$$

In many embodiments, a p-value can be calculated for a traffic impact to verify its statistical significance. In various embodiments, a paired t-test can be used to calculate a p-value. In the same or different embodiments, an impact can only be displayed on a report when its p-value is below and/or above a specific threshold (e.g. 0.05).

In many embodiments, a lift can be calculated for a search algorithm and/or system. A lift can comprise a number of interactions more that one search algorithm has with a search result over another search algorithm. For example, if a first search algorithm, as interleaved, allows for more interactions with a search result than a second search algorithm, then the first search algorithm can be said to have lift over the second search algorithm. In many embodiments, lift can be determined using an equation comprising $$\text{lift} = \frac{B - A}{A}.$$

In many embodiments, various metrics describing technical performance of a search algorithm and/or system can be calculated for the algorithm and/or system. In some embodiments a recall size can be determined for an algorithm and/or system. A recall size can comprise a number of search results returned by a search algorithm and/or system. In the same or different embodiments, a recall size for each search algorithm and/or system can be computed. In some embodiments, a combined recall size can be computed for interleaved search results. In various embodiments, a latency can be determined for an algorithm and/or system. A latency can comprise a time, generally displayed in milliseconds, that it takes for a search algorithm and/or system to return a full set of results. In the same or different embodiments, a latency for each search algorithm and/or system can be computed. In some embodiments, a combined latency can be computed for interleaved search algorithms and/or systems. In the same or different embodiments, mean latency, median, mode, and specific percentiles can be calculated for latency and/or recall size.

In many embodiments, method 400 can comprise an activity 411 of facilitating a display, on an electronic device of an administrator, of a report. In various embodiments, an electronic device of an administrator can comprise admin. computer 360, 361. In these embodiments, then, a display can be facilitated on GUI 370, 371. Other embodiments, displays can be facilitated on other GUIs. In many embodiments, a report can display these metrics, as generated in activity 410 above, in various ways. For example, raw data can be displayed in tables and/or matrices. In these embodiments, various sorting techniques can be used to identify algorithms and/or systems that require further investigation and/or modification. In an embodiment, queries can be sorted by impact using a magnitude difference in interactions. However, these embodiments could be over represent head queries (e.g., queries with more traffic). In some embodiments, queries can be sorted by a percentage lift interactions. However, these embodiments would over represent tail queries (e.g. queries with less traffic). In various embodiments, queries can be sorted based on an equation comprising $$R = \frac{P + 0.1}{\max(A, B)},$$

where P comprise a p value calculated at a query level and max(A,B) comprises a maximum number of interactions for algorithm/system A and B respectively.

In many embodiments, various graphs can be automatically constructed using these metrics. For example, a calculation of lift multiplied by impact can be displayed on a Y axis of a graph, and a ranking of a query response (e.g. a ranking for a specific algorithm/system or a combined ranking) can be displayed on an X axis. Using this graph, an administrator can identify when a specific algorithm/system or an interleaved algorithm/system is performing better at certain rankings that a different algorithm/system. These queries and the associated data can then in turn be provided to a search engineering team for further investigation or development of new search algorithms.

In many embodiments, a report generated from an interleaving system can be used for various applications. For example, a report can be used to determine which search algorithm and/or system out of one or more search algorithms and/or systems is improved. This superior algorithm and/or system can then be implemented for the entire search ecosystem, or it can be applied to a subset of users of the search system that see increased impacts over other users. In some embodiments, a weighting can be determined using a report, and this weighting can be used to determine how often to use one search algorithm and/or system over other algorithms and/or systems. In many embodiments, a report can be used to identify queries that a specific algorithm and/or system perform better and/or worse. These queries can then in turn be provided to a search engineering team for further investigation or development of new search algorithms.

In many embodiments, after a search system has been altered in view of a generated report, method 400 can comprise an optional activity of facilitating a display of search results on an electronic device of a user. As stated above, an electronic device of a user can comprise user computers 330, 331. In these embodiments, search results displayed on an electronic device of a user can comprise search results produced by a search system as altered in view of a report created in activity 410 and displayed in activity 411.

In many embodiments, after a search system has been altered in view of a generated report, method 400 can comprise an optional activity of processing a transaction for an item. In various embodiments, an item can comprise an item in a catalogue of an eCommerce retailer. In the same or different embodiments, an item can be displayed as a part of search results retrieved by a search system after it has been altered in view of a generated report.

In many embodiments, after a search system has been altered in view of a generated report, method 400 can comprise an optional activity of preparing an item for shipment in response to processing a transaction for an item. In the same or different embodiments, preparing an item for shipment can comprise various order processing steps carried out at a warehouse, distribution center, and/or brick and mortar store.

In many embodiments, after a search system has been altered in view of a generated report, method 400 can comprise an optional activity of shipping an item. In some embodiments, an item can be shipped to a user in response to a user purchasing an item on an eCommerce retailer, as described above. In the same or different embodiments, an item can be shipped to a warehouse, distribution center, and/or brick and mortar store in response to increased demand or expected demand. In various embodiments, an item can be shipped using an in house distribution network (e.g., an in house delivery service) and/or an outside distribution network (e.g., drop ship vendors, rideshare services doubling a delivery services, US Mail, etc.).

Figure 5:
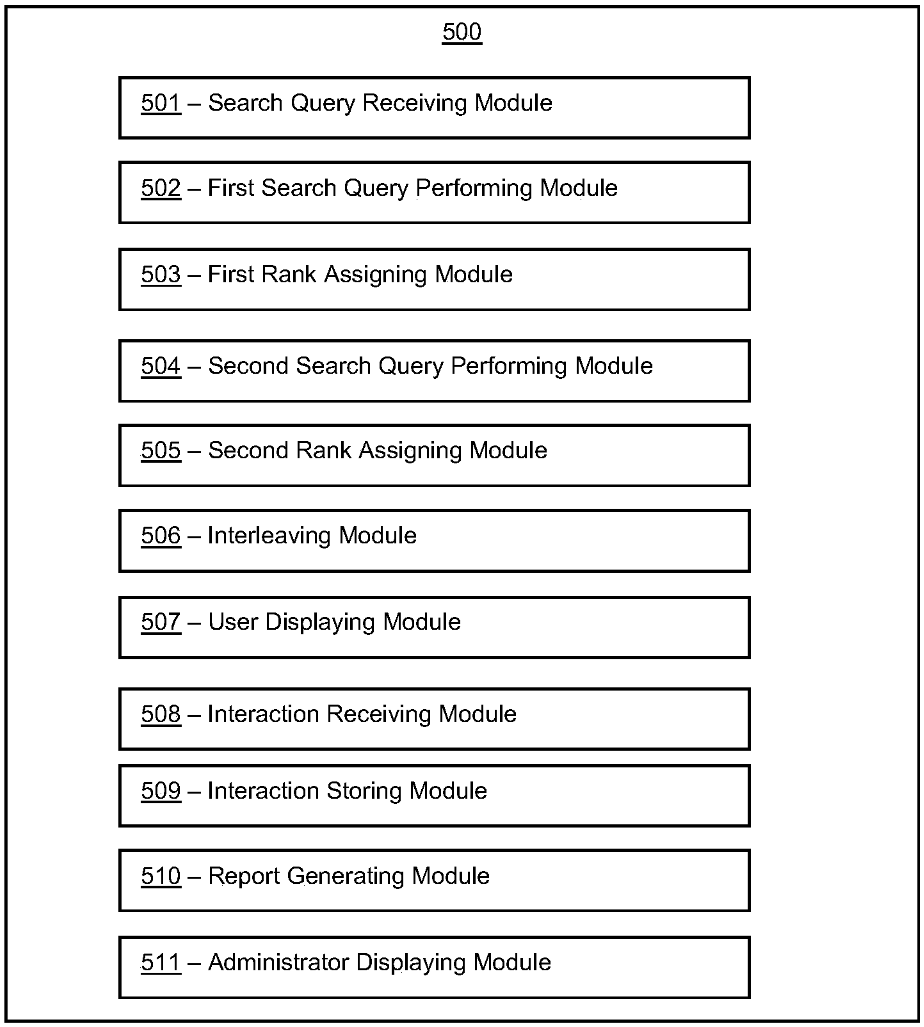
FIG. 5 illustrates a representative block diagram of a system, according to an additional embodiment.

Turning ahead in the drawings, FIG. 5 illustrates a block diagram of a system 500 that can be employed for behavior based messaging. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as search query receiving module 501. In many embodiments, search query receiving module 501 can store computing instructions configured to run on one or more processing modules and perform one or more acts of method 400 (FIG. 4) (e.g., activity 401 (FIG. 4)).

In many embodiments, system 500 can comprise non-transitory memory storage module 502. Memory storage module 502 can be referred to as first search query performing module 502. In many embodiments, first search query performing module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as first rank assigning module 503. In many embodiments, first rank assigning module 503 can store computing instructions configured to run on one or more processing modules and perform one or more acts of method 400 (FIG. 4) (e.g., activity 403 (FIG. 4)).

In many embodiments, system 500 can comprise non-transitory memory storage module 504. Memory storage module 504 can be referred to as second search query performing module 504. In many embodiments, second search query performing module 504 can store computing instructions configured to run on one or more processing modules and perform one or more acts of method 400 (FIG. 4) (e.g., activity 404 (FIG. 4)).

In many embodiments, system 500 can comprise non-transitory memory storage module 505. Memory storage module 505 can be referred to as second rank assigning module 505. In many embodiments, second rank assigning module 505 can store computing instructions configured to run on one or more processing modules and perform one or more acts of method 400 (FIG. 4) (e.g., activity 405 (FIG. 4)).

In many embodiments, system 500 can comprise non-transitory memory storage module 506. Memory storage module 506 can be referred to as interleaving module 506. In many embodiments, interleaving module 506 can store computing instructions configured to run on one or more processing modules and perform one or more acts of method 400 (FIG. 4) (e.g., activity 406 (FIG. 4)).

In many embodiments, system 500 can comprise non-transitory memory storage module 507. Memory storage module 507 can be referred to as embedding user displaying module 507. In many embodiments, user displaying module 507 can store computing instructions configured to run on one or more processing modules and perform one or more acts of method 400 (FIG. 4) (e.g., activity 407 (FIG. 4)).

In many embodiments, system 500 can comprise non-transitory memory storage module 508. Memory storage module 508 can be referred to as interaction receiving module 508. In many embodiments, interaction receiving module 508 can store computing instructions configured to run on one or more processing modules and perform one or more acts of method 400 (FIG. 4) (e.g., activity 408 (FIG. 4)).

In many embodiments, system 500 can comprise non-transitory memory storage module 509. Memory storage module 509 can be referred to as interaction storing module 509. In many embodiments, interaction storing module 509 can store computing instructions configured to run on one or more processing modules and perform one or more acts of method 400 (FIG. 4) (e.g., activity 409 (FIG. 4)).

In many embodiments, system 500 can comprise non-transitory memory storage module 510. Memory storage module 510 can be referred to as report generating module 510. In many embodiments, report generating module 510 can store computing instructions configured to run on one or more processing modules and perform one or more acts of method 400 (FIG. 4) (e.g., activity 410 (FIG. 4)).

In many embodiments, system 500 can comprise non-transitory memory storage module 511. Memory storage module 511 can be referred to as administrator displaying module 511. In many embodiments, administrator displaying module 511 can store computing instructions configured to run on one or more processing modules and perform one or more acts of method 400 (FIG. 4) (e.g., activity 411 (FIG. 4)).

Although systems and methods for interleaving search results have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions that, when executed on the one or more processors, cause the one or more processors to perform operations comprising:

generating, using at least two different search algorithms, combined search results based on a search query from an electronic device of a user, each search result of the combined search results having a respective rank based on at least one of the at least two different search algorithms;

storing interactions by at least one user with the search results of the combined search results, wherein an interaction with a respective search result of the combined search results indicates which of the at least two different search algorithms returned the respective search result;

determining a set of search results from the combined search results based on the stored interactions, wherein each result within the set of search results was respectively interacted with by the at least one user;

determining a traffic impact for at least one of the at least two different search algorithms based on the set of search results, wherein the traffic impact is based on:

a number of search results, in the set of search results, that were interacted with by the at least one user and were returned by both a first search algorithm and a second search algorithm of the at least two different search algorithms, a number of search results, in the set of search results, that were interacted with by the at least one user and were returned by the first search algorithm but not the second search algorithm, and a number of search results, in the set of search results, that were interacted with by the at least one user and were returned by the second search algorithm but not the first algorithm; and implementing the first search algorithm or the second search algorithm on a website based on the determined traffic impact.

2. The system of claim 1, wherein generating the combined search results comprises:

interleaving search results of the second search algorithm and search results of the first search algorithm.

3. The system of claim 1, wherein generating the combined search results comprises:

including a copy of a search result returned by both the first search algorithm and the second search algorithm.

4. The system of claim 1, wherein the respective interaction with each result within the set of search results comprises at least one of:

a click through of the result;

an item view of the result;

an add to cart of the result; or a purchase of the result.

5. The system of claim 1, wherein the operations further comprise:

hashing a user ID of the user; and determining that the user is eligible for a search algorithm test based upon the user ID, as hashed.

6. The system of claim 1, wherein each search result within the set of search results has an identical rank in both search results of the first search algorithm and search results of the second search algorithm.

7. The system of claim 1, wherein the operations further comprise:

generating a report comprising the traffic impact, wherein generating the report is based at least in part on the respective interaction with each result within the set of search results, and is further based at least in part on at least one of:

determining a latency of the first search algorithm;

determining a latency of the second search algorithm;

adding the latency of the first search algorithm and the latency of the second search algorithm to the report;

determining a recall size of the first search algorithm;

determining a recall size of the second search algorithm; or adding the recall size of the first search algorithm and the recall size of the second search algorithm to the report.

8. The system of claim 7, wherein generating the report further comprises:

plotting a graph comprising:

an axis for a lift of the second search algorithm over the first search algorithm for each respective rank in the combined search results; and an axis for the traffic impact for each result rank in the set of search results; and adding the graph to the report.

9. A method being implemented via execution of computing instructions configured to run at one or more processors and configured to be stored at one or more non-transitory computer-readable media, the method comprising:

generating, using at least two different search algorithms, combined search results based on a search query from an electronic device of a user, each search result of the combined search results having a respective rank based on at least one of the at least two different search algorithms;

storing interactions by at least one user with the search results of the combined search results, wherein an interaction with a respective search result of the combined search results indicates which of the at least two different search algorithms returned the respective search result;

determining a set of search results from the combined search results based on the stored interactions, wherein each result within the set of search results was respectively interacted with by the at least one user;

determining a traffic impact for at least one of the at least two different search algorithms based on the set of search results, wherein the traffic impact is based on:

a number of search results, in the set of search results, that were interacted with by the at least one user and were returned by both a first search algorithm and a second search algorithm of the at least two different search algorithms, a number of search results, in the set of search results, that were interacted with by the at least one user and were returned by the first search algorithm but not the second search algorithm, and a number of search results, in the set of search results, that were interacted with by the at least one user and were returned by the second search algorithm but not the first search algorithm; and implementing the first search algorithm or the second search algorithm on a website based on the determined traffic impact.

10. The method of claim 9, wherein generating the combined search results comprises:

interleaving search results of the second search algorithm and search results of the first search algorithm.

11. The method of claim 9, wherein generating the combined search results comprises:

including a copy of a search result returned by both the first search algorithm and the second search algorithm.

12. The method of claim 9, wherein the respective interaction with each result within the set of search results comprises at least one of:

a click through of the result;

an item view of the result;

an add to cart of the result; or a purchase of the result.

13. The method of claim 9 further comprising:

hashing a user ID of the user; and determining that the user is eligible for a search algorithm test based upon the user ID, as hashed.

14. The method of claim 9, wherein each search result within the set of search results has an identical rank in both search results of the first search algorithm and search results of the second search algorithm.

15. The method of claim 9 further comprising:

generating a report comprising the traffic impact, wherein generating the report is based at least in part on the respective interaction with each result within the set of search results, and is further based at least in part on at least one of:

determining a latency of the first search algorithm;

determining a latency of the second search algorithm;

adding the latency of the first search algorithm and the latency of the second search algorithm to the report;

determining a recall size of the first search algorithm;

determining a recall size of the second search algorithm; or adding the recall size of the first search algorithm and the recall size of the second search algorithm to the report.

16. The method of claim 15, wherein generating the report further comprises: plotting a graph comprising: an axis for a lift of the second search algorithm over the first search algorithm for each respective rank in the combined search results; and an axis for the traffic impact for each result rank in the set of search results; and adding the graph to the report.

* * * * *